April 29, 1930.  J. M. BARR  1,756,672
DYNAMO ELECTRIC MACHINE
Filed Oct. 12, 1922  3 Sheets-Sheet 1

Inventor:
John M Barr
By Edwin B.H. Towe
Atty

April 29, 1930.    J. M. BARR    1,756,672
DYNAMO ELECTRIC MACHINE
Filed Oct. 12, 1922    3 Sheets-Sheet 2
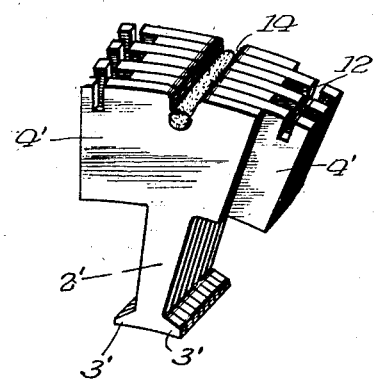
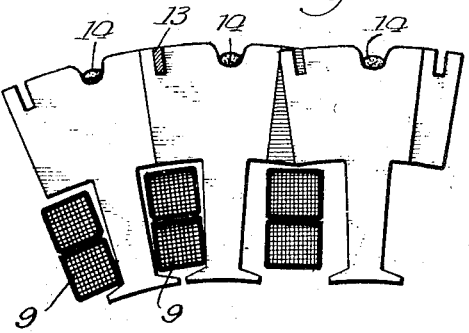
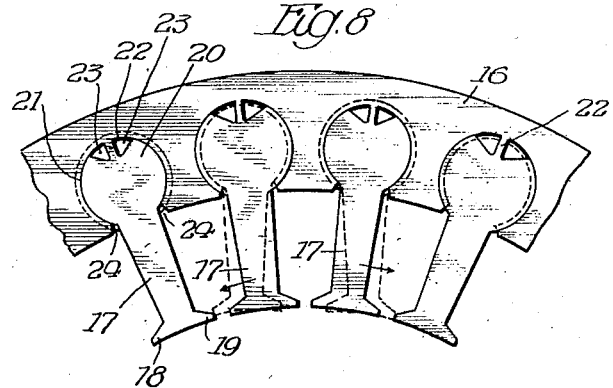
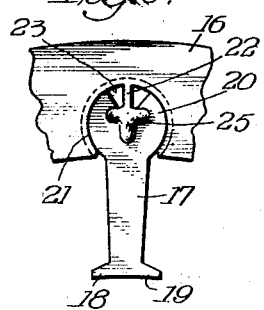
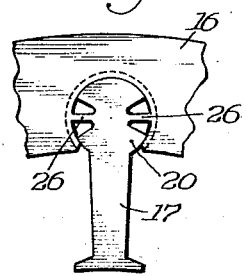
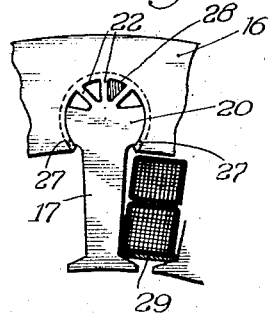
Inventor
John M. Barr
By Edwin B. H. Tower Jr.
Atty.

April 29, 1930.                J. M. BARR                1,756,672
                        DYNAMO ELECTRIC MACHINE
                    Filed Oct. 12, 1922      3 Sheets-Sheet 3

Inventor:
John M. Barr.
By Edwin Bott. Taeusch
Atty.

Patented Apr. 29, 1930

1,756,672

UNITED STATES PATENT OFFICE

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN

DYNAMO-ELECTRIC MACHINE

Application filed October 12, 1922. Serial No. 594,151.

This invention relates to a dynamo electric machine.

It is particularly applicable to the toothed magnetic flux carrying members of such machines having slots for receiving current carrying coils.

An object of the invention is to provide an efficient magnetic core of the partially closed slot type which is economical to manufacture and to which formed coils may readily be applied.

Another object is to provide a magnetic core having laminated pole sections or teeth which are movable to facilitate the insertion of coils therebetween.

Another object is to provide a magnetic core having partially closed slots in which the coils may be inserted without danger of injury to the insulation thereof.

Other objects and advantages will hereinafter appear.

According to the invention, the core has teeth movably arranged relative to each other to permit the separation of adjacent teeth for the insertion of coils therebetween.

Means are provided to limit the relative movement of the teeth and to lock them in position after the coils have been inserted.

The invention will be described as applied to a stator or field magnet core, although it will be understood that it is also applicable to the rotor or armature core of a dynamo electric machine.

Figure 5:
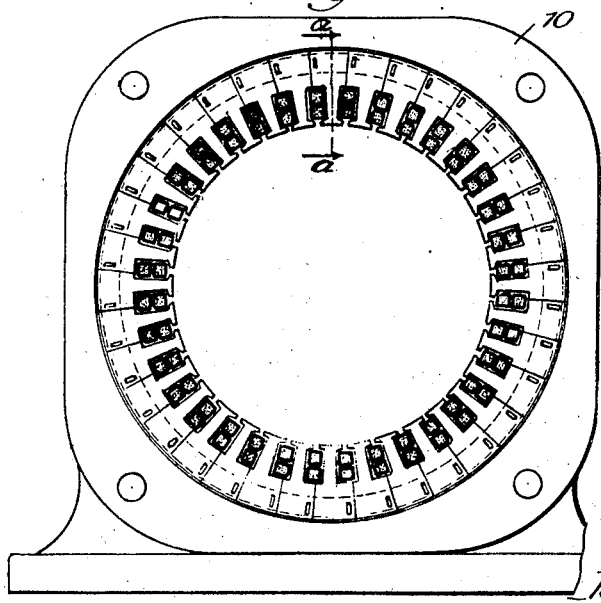
Fig. 5 is a side elevation of the magnet core with formed coils arranged in the slots thereof and applied to a frame member of a dynamo electric machine.
Figure 5A:
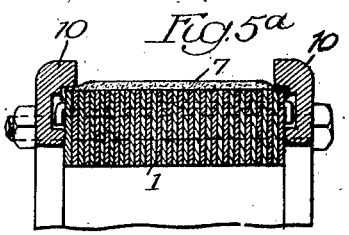
Figure 5B:
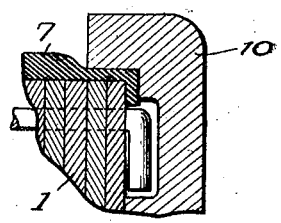

Fig. 5ª is a vertical section on line a—a of Fig. 5.

Fig. 5ᵇ is an enlarged vertical section through part of one frame member and a portion of the stator core.

Fig. 6 is a perspective view of a modified form of laminated tooth, the base of which is slotted to receive a member for locking adjacent teeth together.

Fig. 7 is a side elevation of a portion of a magnet core as shown in Fig. 6 with one locking member removed and the two adjacent teeth swung apart to allow a formed coil to be inserted in the slot therebetween.

Fig. 8 shows a section of a core and tooth lamina so formed that the teeth while integrally united to the core are bodily movable about a fixed pivot.

Figs. 9, 10 and 11 show core and tooth laminae employing different forms of the integral connections.

Figure 12:
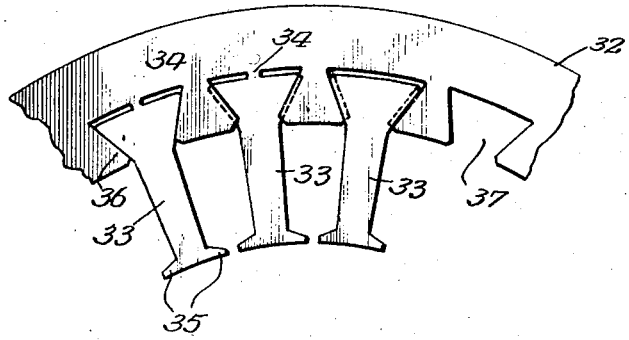

Fig. 12 shows a section of core lamina having the teeth removable therefrom.

Figure 13:
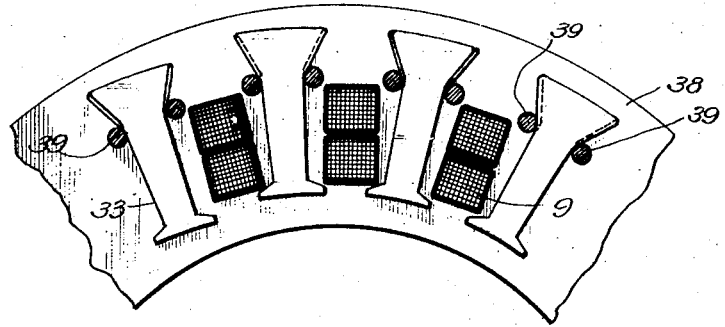

Fig. 13 is a top plan of a form on which the teeth may be arranged so as to readily apply the formed coils thereto.

Figure 14:
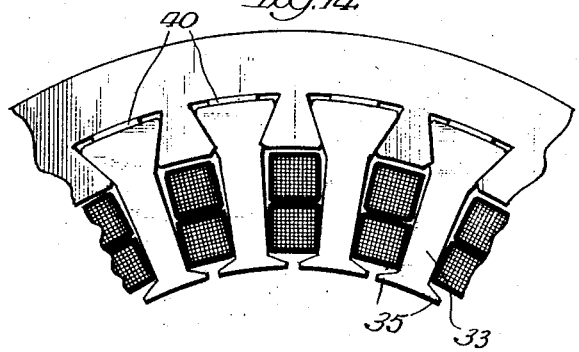

Fig. 14 is a side elevation of a section of magnet core wherein the teeth with the coils in position are locked to the core.

Figs. 1 to 5 will first be described.

The magnet core is formed of laminated sections, each section having a tooth formed integrally therewith.

Each core section and integral tooth is made up of a plurality of laminae.

Each lamina 1 is substantially I-shaped, the shank 2 thereof having laterally extending edge projections 3 at one end thereof and laterally extending edge projections 4 and 5 of unequal length at the other end thereof.

The laterally extending projections 4 and 5 form part of the base of the tooth lamina. Each lamina in one corner of the projection 4 thereof is provided with an opening for receiving a locking member by which the core sections are locked together as will more fully hereinafter appear.

Figure 1:
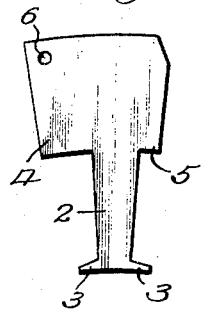
Figure 1 is a side elevation of one of the laminae forming a tooth of a stator or field magnet core.
Figure 2:
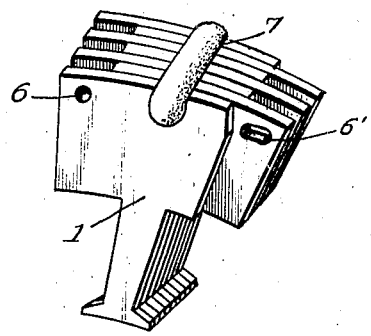
Fig. 2 is a perspective of a laminated tooth of the core.
Figure 3:
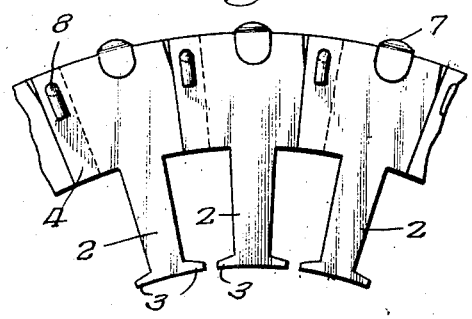
Fig. 3 is a side elevation of a portion of the magnet core with several teeth hinged together and pivotally connected in the position that they assume when assembled in the machine.

This opening may be either circular as shown at 6 in Fig. 1, or elongated, as shown at 6' in Fig. 2.

The core laminæ are stacked to form a core section such as is shown in Fig. 2, the laterally extending base extensions 4 and 5 being staggered to form tongue and groove connections between adjacent assembled core sections.

After the laminæ have been stacked in staggered relation to form a core section these laminæ are welded or otherwise rigidly fastened together along the base edge thereof, as indicated at 7 in Fig. 2, so that the laminæ in each section may be handled as a unit.

When assembling the core sections to form a complete core, the tongues 4 of one section enter the grooves of the adjacent section and a pivot 8 is extended through the alined openings 6 and 6' so as to hinge the sections together.

Figure 4:
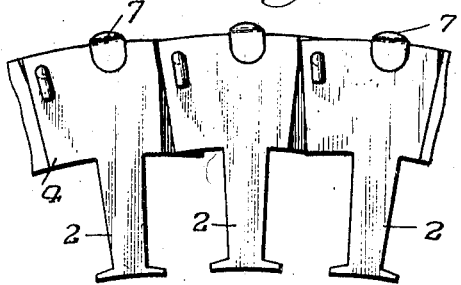
Fig. 4 is a side elevation of a portion of the magnet core with adjacent teeth swung apart to allow a formed coil to be inserted in the slot therebetween.

The teeth are thus pivotally connected to the core and may be swung apart, in planes parallel with themselves, as shown in Fig. 4, to allow the insertion of formed coils 9 in the slots or openings between adjacent teeth.

The spreading apart of the teeth in the assembled core and the insertion of the formed coils in the slots thereof is further facilitated by employing laminated core sections in which the base has elongated openings on both sides thereof or circular openings 6 on one side and elongated openings 6' on the other as shown in Fig. 2.

The core sections when hinged together form an annular core, the teeth thereof extending radially toward the center.

This annular core may very readily be distorted temporarily to approximate an ellipse, thus increasing the distance between pole tips of adjacent teeth along the substantially flattened sides thereof to approximate the normal width of the slot, or greater, to allow the formed coils to be inserted in the slots.

The core with the coils applied thereto may then be clamped between the end frame members 10 of a dynamo electric machine with the ends of the core fitting in circular shoulders in the frame members so as to maintain the free ends of the core on the circumference of a circle concentric with the usual bearings provided in the end frame members of the machine.

Welded ridges 7 on the periphery and sides of the core are machined to form true bearing surfaces for the end frame members 10, either before or after the coils are applied to the core.

Figs. 6 and 7 show the magnetic stator core made up of laminated sections similar to those of Figs. 1 to 5 inclusive, but having base extensions 4' thereof slotted as at 12 to receive bars 13 by which adjacent sections are locked together.

The stacked laminæ are welded or otherwise rigidly fastened together along the base of registering grooves 14 provided in the laminæ.

Thus after the coil has been assembled it will not be necessary to machine the welded ridges before placing the core in the end frame members of the dynamo electric machine.

The formed coils may be arranged in a temporary form and the core built up around the arranged coils by inserting the teeth one at a time between adjacent pairs of coils.

The adjacent tooth sections are then locked together by the bars or wedges 13 so that in the completely assembled core with the coils applied thereto the free ends of the teeth are maintained on the circumference of a circle.

Such core sections may be assembled to form a complete core and the teeth thereof spread apart to allow the formed coils to be inserted in the slots thereof, after which adjacent core sections may be locked together as before described.

The teeth, in spreading apart or in coming together, move in planes parallel with themselves, as shown in Fig. 7.

Fig. 8 shows a portion of a laminated magnetic stator core in which each lamination is a continuous ring 16.

The teeth 17 having extended pole tips 18 and 19 to form partially closed slots are integrally united to the core ring 16.

The circular base 20 of each tooth lamination is positioned within a substantially circular opening 21 in the annular core lamination and is integrally united thereto by a strip 22, formed by cutting away sections 23 of the circular base 20 at either side of the strips.

Adjacent tooth bases in the same laminations are of different sizes. Therefore, when the core laminations are assembled with the tooth bases of different sizes staggered, as shown in Fig. 8, the complete tooth is locked against lateral displacement.

The staggering of the tooth base laminations of different sizes causes the tooth base laminations along the flat sides thereof to be engaged by the overlapping adjacent core laminations, and thus increases the flux carrying capacity of the teeth and core.

The inner periphery of the annular core laminations 16 is cut away at either side of each tooth as shown at 24 so as to allow the teeth of the completely assembled core to be moved about a fixed pivot at the center of the tooth base.

The narrow strips 22 uniting the teeth to the annular core 16 are bent when the teeth are swung apart as indicated by dotted lines in Fig. 8 to allow the insertion of the formed coils in the slots and also when the teeth are returned to their normal positions.

However, such bending of the strips 22 does not affect the position of the free ends of the teeth, for the bases thereof are firmly held against displacement in the circular openings of the annular core 16.

Fig. 9 shows a section of laminated annular stator core similar to that of Fig. 8 in which the circular base 20 of the tooth is embossed as at 25. The diameter of the circular base 20 is thus decreased slightly to provide a small clearance between the periphery of the base and the circular opening 21. The movement of the teeth about their pivots is thus facilitated.

Fig. 10 shows another modification in which the tooth base 20 is integrally united to the core lamination 16 by two narrow strips 26 which not only serve to integrally unite the tooth lamination to the annular core lamination but provide an uninterrupted flux carrying path across the tooth base.

Fig. 11 shows another modification in which the tooth base is integrally united to the core lamination by a plurality of narrow strips 22.

To assist in properly alining the tooth after formed coils have been inserted in the slots small projections 27 formed on the tooth base lamination co-operate with similarly formed recesses in the core lamination so as to lock the tooth in position.

When the formed coils are to be applied to the complete core the tooth is first moved transversely with respect to the core so as to release the projections or shoulders 27 and is then swung about its base as a pivot so as to separate the overhanging pole tips of the tooth and allow the formed coils to pass therebetween and into the slots.

After the coils have been applied to the core each tooth is moved back into its original position perpendicular to the core ring and is driven or forced into the circular opening of the core ring until the shoulders or projections 27 engage their respective co-operating recesses.

To assist in holding the tooth in its final position a locking bar 28 which may be of fiber or other non-conducting non-magnetic material may be driven through the alined openings in the base laminations of the tooth, as shown. Instead of employing member 28 to lock the teeth in final position a fibre or other non-magnetic strip 29 may be placed between adjacent teeth and between the overhanging pole tips thereof and the top coils in the slots.

Figs. 12 to 14 inclusive show a laminated stator core having the teeth thereof removably connected thereto.

Each core lamination as originally made comprises an annular disk with inwardly projecting teeth 33 integrally connected thereto by narrow strips 34.

Each tooth 33 at the free end thereof is provided with lateral projections 35, and has a wedge shaped base 36 located in a wedge shaped recess 37 in the annular disk from which it is punched.

The bases 36 of alternate teeth are of different sizes.

The laminations are piled one upon another so that teeth having bases of different sizes are arranged one upon another alternately to form a tooth unit having a tongue and groove connection with the core member 32.

The core laminations with the integral tooth laminations partly punched therefrom are asembled to form the entire core, and the laminations may be temporarily clamped together so as to facilitate further operations in connection therewith.

Furthermore, the laminations of each complete tooth may be temporarily bound together so each tooth may be handled as a unit.

The narrow strips 34 are cut away after assembly of the core, as shown in Fig. 12, so as to permit removal of the core teeth.

Each tooth may then be driven radially outward so that the tongues thereof clear the tongues of the core member 32.

The tooth unit may then be moved laterally with respect to the core member and removed therefrom.

The teeth may then be placed on a form consisting of a block 38 having upwardly projecting pins 39 arranged in a circle. Each tooth is placed between a pair of the pins so as to be readily movable in the horizontal plane.

The formed coils are then arranged between the teeth.

The teeth with the coils therebetween are applied to the core member 32 with the wedge shaped tooth bases 36 located within the wedge shaped openings 37 in the core member.

Each tooth is rigidly fastened to the core member 32 by a wedge 40 driven between the outer edge of the tooth base 36 and the base of the tooth receiving opening 37 in the core member to make the tongue and groove connection between the tooth and the core member. By employing any of the core structures described herein, coil units may be applied readily thereto without sacrificing any of the advantages resulting from the use of partially closed slots.

The invention set forth herein is, of course, susceptible of other embodiments and adaptations.

The invention claimed is:

1. A magnetic core of the partially closed slot type having the teeth thereof pivotally supported so adjacent teeth can be swung apart to allow formed coils to be inserted in the slots.

2. A magnetic core of the partially closed slot type having the teeth thereof bodily circumferentially movable to and from one another so as to allow formed coils to be inserted in the slots.

3. A magnetic core of the partially closed slot type, having the teeth thereof pivotally supported to swing about a fixed pivot to and from one another so as to allow formed coils to be inserted in the slots.

4. A laminated magnetic core of the partially closed type comprising laminated sections each forming a tooth having a widened base with unequal lateral extensions, the laminations of each tooth base being staggered so as to form a tongue and groove connection between adjacent sections, adjacent teeth being bodily movable with respect to each other so as to allow formed coils to be inserted in the slots.

5. A laminated magnetic core of the partially closed slot type comprising laminated sections, each forming a tooth having a widened base with unequal lateral extensions, the laminations of each tooth base being staggered so as to form a tongue and groove connection between adjacent sections, adjacent teeth being bodily movable with respect to each other so as to allow formed coils to be inserted into the slots, and members extending through the tooth base laminations to lock the sections together.

6. A laminated magnetic core of the partially closed slot type comprising laminated sections, each forming a tooth having a widened base with unequal lateral extensions, the laminations of each tooth base being staggered so as to form a tongue and groove connection between sections, adjacent teeth being bodily movable with respect to each other, and locking members extending through the tooth base laminations and serving as pivots about which the teeth can be swung.

7. A magnetic stator frame of the partially closed slot type composed of laminations and having teeth which can be swung about fixed pivots to and from one another so as to allow formed coils to be inserted in the slots.

8. A stator frame composed of magnetic laminations and having teeth provided with extensions at the free ends thereof to form partially closed slots, adjacent teeth being movable about fixed pivots so as to allow formed coils to be inserted in the slots.

9. A laminated magnetic core of the partially closed slot type composed of laminated sections hinged together, each section of laminations forming a tooth provided with laterally extending pole tips to form partially closed slots, the base of each tooth lamination being unequally extended laterally in opposite directions and the laminations of each section arranged in staggered relation so as to provide tongue and groove connections between adjacent sections.

10. In a dynamo electric machine, a laminated core having teeth pivoted thereto, adjacent teeth being provided with polar extensions so as to form partially closed slots into which a formed coil may be bodily inserted when adjacent teeth are swung apart.

11. In a dynamo electric machine, a flux carrying member having spaced laminated projections pivotally connected thereto, the free ends of adjacent projections being provided with lateral extensions for retaining a conductor in the space between adjacent projections.

12. In a dynamo electric machine, a core comprising a plurality of core sections each composed of similarly formed laminæ, said core sections being connected together for relative bodily circumferential displacement.

13. As an article of manufacture, a lamina for a flux carrying core having teeth arranged in series to form slots between adjacent teeth and each of said teeth provided with a coil retaining projection at the free end thereof so that the width of the entrance of each of said slots is less than the width of the slot, each tooth being bodily circumferentially movable with respect to adjacent teeth to make the slot entrance substantially the width of the slot.

14. In a dynamo electric machine, a laminated core having teeth each provided with a coil retaining projection at the free end thereof so that the entrance to the slot is of less width than the slot, each tooth being pivotally connected to the core so that adjacent teeth may be swung apart to make the slot entrance of substantially the width of the slot to allow a coil of greater width than the normal entrance to be inserted therein.

15. In a dynamo electric machine, a laminated core having teeth each provided with coil retaining projections at the free ends thereof forming partially closed slots between the teeth, each tooth being bodily circumferentially movable with respect to adjacent teeth to make the entrances to said slots substantially as wide as the slots.

16. In a dynamo electric machine, a laminated core comprising a plurality of substantially I-shaped laminæ having relatively narrow projections oppositely disposed at one end thereof and relatively wide projections of unequal length oppositely disposed at the other end thereof, said laminæ being assembled with said relatively wide projections of unequal length arranged in staggered relation to form tongue and groove connections between adjacent core sections, and means adapted to secure said adjacent core sections together.

17. In a dynamo electric machine, a core comprising a plurality of pivoted teeth forming core sections circumferentially arranged to form the core member and movable apart from each other to allow the insertion of coils between each section.

18. In a dynamo electric machine, a core comprising a plurality of pivoted core sections capable of relative longitudinal displacement circumferentially of the core.

19. In a dynamo electric machine, a laminated core comprising a plurality of core sections each core section comprising a plurality of unsymmetrical similarly formed laminæ alternately oppositely disposed, each of said laminæ having a slot at its outer edge and on one side thereof, and means engaging said slots for fastening the laminæ of each section together as a unit.

20. In a dynamo electric machine, a core comprising a plurality of pivoted teeth, the spaces between which form retaining openings for coils, said teeth being bodily movable circumferentially of the core.

21. In a dynamo electric machine, a core comprising a plurality of pivoted teeth, the spaces between which form retaining openings for coils, the projecting ends of adjacent teeth being relatively movable toward or away from each other, said teeth being circular at their outer ends and having slots therein, and means for fastening the laminæ together.

22. A core for a dynamo electric machine, comprising a plurality of sections, each composed of a tooth having a base, tongues and grooves on the sides of said base to engage corresponding tongues and grooves on the adjacent teeth, and a wedge securing said tooth in fixed position relatively to the adjacent teeth.

23. A core for a dynamo electric machine, comprising teeth movable toward and away from each other to allow coils to be inserted therebetween, and means for limiting movement of said teeth.

In witness whereof, I have hereunto subscribed my name.

J. M. BARR.